(No Model.)
G. H. F. SCHRADER.
VALVE FOR PNEUMATIC TIRES.
No. 483,172. Patented Sept. 27, 1892.
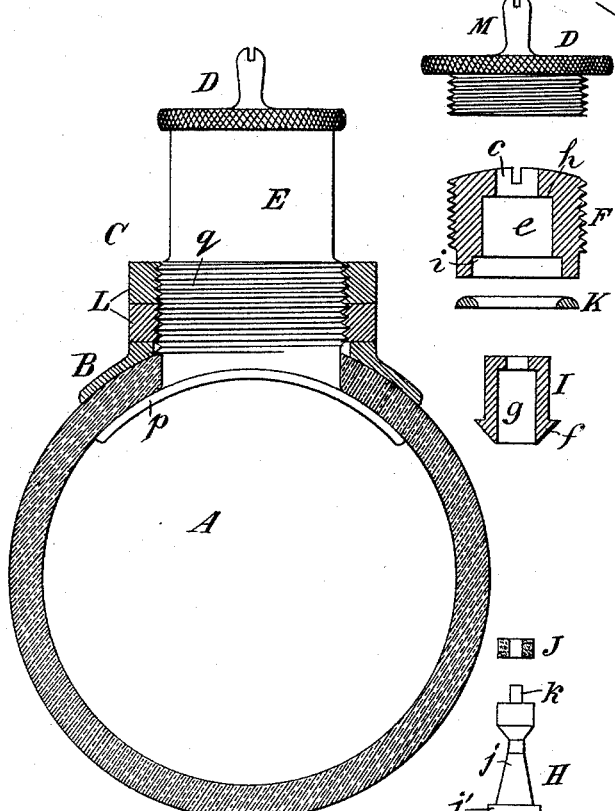
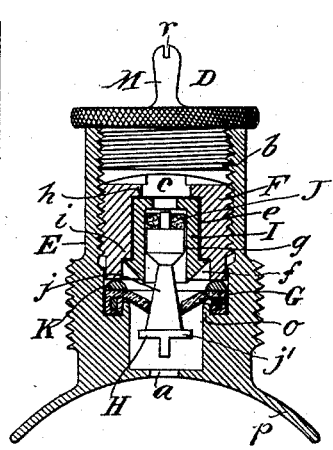
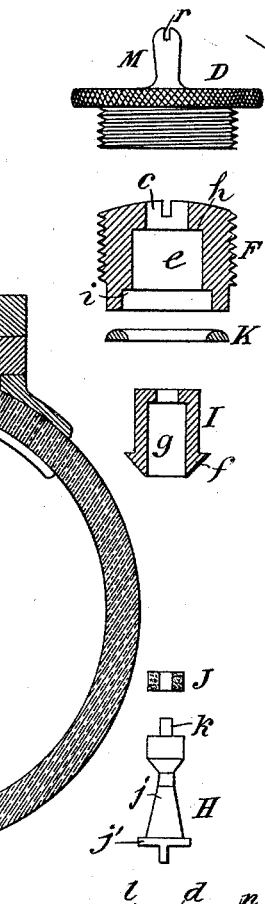
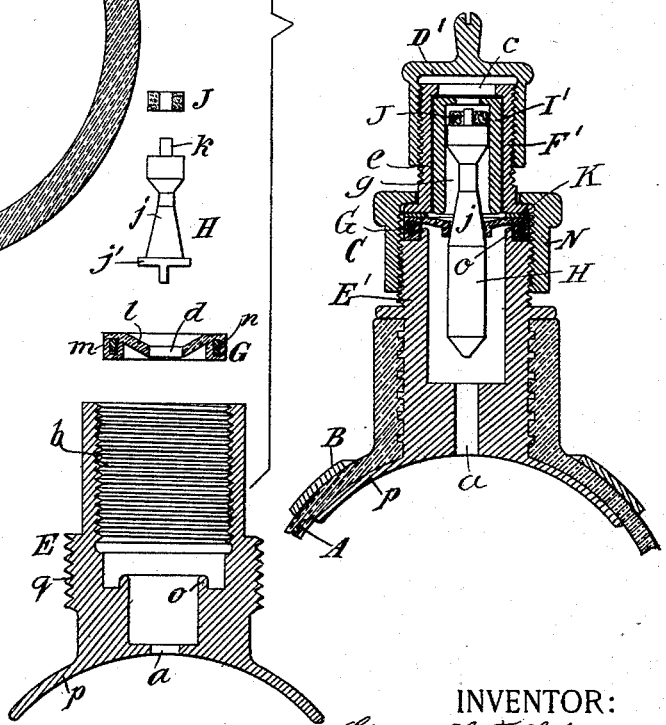
WITNESSES:
John Becker
Fred White
INVENTOR:
George H. F. Schrader,
By his Attorneys,
Arthur O. Fraser & Co.

UNITED STATES PATENT OFFICE.

GEORGE H. F. SCHRADER, OF NEW YORK, N. Y.

VALVE FOR PNEUMATIC TIRES.

SPECIFICATION forming part of Letters Patent No. 483,172, dated September 27, 1892.

Application filed June 15, 1892. Serial No. 436,792. (No model.)

*To all whom it may concern:*

Be it known that I, GEORGE H. F. SCHRADER, a citizen of the United States, residing in the city, county, and State of New York, have invented certain new and useful Improvements in Valves for Pneumatic Bicycle-Tires and for other Purposes, of which the following is a specification.

This invention relates especially to air-valves for pneumatic tires of bicycles, but it may be advantageously employed for other valves.

Various constructions of valves for pneumatic tires are known—for example, that shown in my United States Patent No. 473,673, dated April 26, 1892.

My present invention aims to provide an improved valve of this class and one through which a reversed flow can be conveniently permitted to exhaust the pressure in the tire, to provide means for preventing access of oil or foreign matters to the working parts of the valve, to improve, simplify, and perfect the various details of the valve, and to provide improved means for its connection to the tire of a bicycle, and for protection of the delicate parts of the valve from injury due to external forces. To this end, in carrying out my invention in its preferred form, I provide the valve with a movable part at the ingress side, constructed when moved toward the valve to permit an outflow through it, and I provide an absorbent material adapted to arrest foreign matter or oil and prevent such from entering the valve proper, and I provide certain other improvements which will be hereinafter more fully set forth.

In the accompanying drawings, which illustrate certain adaptations of my invention, Figure 1 is an elevation of the preferred form of my improved valve as applied to a bicycle-tire, the latter being shown in section. Fig. 2 is a vertical axial section of the valve shown in Fig. 1. Fig. 3 is a view showing the various parts of this valve detached from each other and in axial section, and Fig. 4 is an axial section of a slightly-modified form of valve embodying certain features of my invention.

Referring to the drawings, let A indicate the hollow tire of a bicycle or any other vessel to which the valve may be applied, B the felly thereof, C the valve as a whole, and D the protecting-cap for the latter.

Referring to Figs. 1, 2, and 3, I will describe the preferred form of my invention. In this construction the valve C consists of an outer casing inclosing the working parts and conduits of the valve. This casing may be variously constructed, but is preferably constituted, as here shown, of an outer tubular shell E and an inner tubular plug F, the shell being formed with an eduction-conduit $a$, communicating with the interior of the tire A at its lower end, and with an internally-screw-threaded chamber $b$, into which the externally-screw-threaded plug F is screwed, and the latter being constructed with a suitable induction-conduit, as $c$, the two being constructed to maintain the working parts between them. The working parts of the valve may be of any suitable construction. Those shown consist of a flexible disk G, having an air-tight joint with the casing around the eduction-conduit free at its center and having the usual perforation $d$ at its free portion, and an imperforate plug H, traversing the perforation $d$ and closing the latter to prevent an outflow through the valve while the inflow is permitted between the plug and the sides of the perforation, according to the principle disclosed in my said patent.

According to my invention I provide means for opening the valve to permit an outflow. In the construction shown in Figs. 1, 2, and 3 this is accomplished by providing a movable part at the ingress side of the valve, constructed when moved toward the latter to distend its free portion and permit a passage between the egress and ingress conduits around the sides of the plug H. Preferably this movable part consists of an annular piece I, seated in a socket $e$ in the plug F, having a tapering end $f$, adapted to contact with the free portion of the disk G, having a recess $g$, loosely receiving the upper end of the plug H, and a perforation $h$ at top, serving, with its recess $g$, as part of the induction-conduit. The outward movement of the piece I is limited by the upper end of the recess $e$ in the plug F or by a shoulder $i$ at the lower part of the recess $e$, as desired, and from this position the piece I can be moved inwardly toward the disk G by inserting any suitable tool through the induction-aperture c of the plug F and pressing it against the upper end of the piece I, whereby the latter can be forced against the disk G to distend its perforation d out of contact with the plug H, whereupon an outflow through the valve may occur. The tapered lower end f of the piece I will be expelled from the disk G by reason of the contraction of the latter, should it happen to enter the perforation therein.

According to my invention the plug H, which is shown as the ordinary well-known imperforate movable plug, is constructed with a reduced and preferably tapered portion j at the ingress side of the valve, which tapered portion preferably extends through and beyond the perforation d of the disk G. This reduced portion permits a larger air-space at the ingress side of the valve, and when the plug is moved either with the piece I or alone toward the disk its reduced portion approaches toward or advances through the perforation d, and thereby leaves an extended air-space therethrough while it is held in this position, whereby an exhaust flow may occur. Thus the exhaust flow may be occasioned simply by moving inwardly the plug; but preferably it is accomplished by moving both the piece I and the plug with it inwardly, whereby the piece distends the disk and the reduced portion of the plug gives a larger exit-space. The tapered plug is forced outwardly into the perforation of the disk by the inner air-pressure when the plug is released, and its large portion closes the perforation to prevent escape under ordinary circumstances. It is desirable to construct the plug with a large head $j'$ at its egress end, which prevents its being inserted wrong side up in the valve, and can, if desired, be located to abut against the disk to limit the extreme outward movement of the plug therethrough.

According to my invention I provide a fibrous or absorbent material in the induction-conduit to arrest or absorb foreign matter or oil before such reached the working parts of the valve. Preferably this is accomplished by providing a fibrous absorbent washer J in the induction-conduit. In the construction shown a perforated washer J is employed and is placed at the top of the recess g in the piece I, being shown as carried on a pin k, formed on the top of the plug H. By this provision oil and other foreign matter will be arrested or absorbed and cannot reach the valve proper to impair its operation.

According to my invention I provide an improved flexible disk G. Preferably this disk is of molded rubber and formed with a thin flexible middle portion l, having the form of a truncated cone, and an enlarged or thickened flange m, exteriorly thereof and adapted to be clamped between the casing or shell part of the valve and serve as a packing. Preferably, also, as a means of preventing the distortion of the disk I mold into the flange m of the disk a thin metallic ring n, which insures preservation of the shape of the disk.

According to my invention I construct the portion of the valve-casing which clamps against the disk G with a lip fitting the enlarged portion m thereof internally to prevent distortion thereof. This lip is lettered o, and preferably I also interpose a thin antifriction-ring K at the ingress side of the disk G and between it and the portion of the valve-casing against which it is clamped, as best seen in Fig. 2, whereby when the valve-casing is screwed together to clamp the disk in place the rotary motion of one part of the casing relatively to the other will act on the ring K instead of directly on the disk G, the tendency being to prevent distortion of the disk. In the construction shown the ring K is within the shell E, seating on top of the disk G, and the lower edge of the plug F bears on the ring, on which it moves as it is screwed into the shell. The shell E is, as heretofore, constructed with a foot p on its lower end, fitting the interior of the tire, and with an external screw-threaded portion q above this foot and beyond the felly B, which portion is engaged by two nuts L L, the lower of which when screwed down draws the shell and its foot p outwardly and clamps the tire between the latter and the felly B, while the upper nut serves as a set-nut to prevent loosening of the lower nut. This affords a simple and convenient air-tight connection. Above the screw-threaded portion q the shell E is preferably constructed as a plain cylinder, into the upper end of which is screwed the cap D, thus completely inclosing within the shell all the parts of the valve.

A feature of my invention is a convenient tool for manipulating the valve to permit an outflow. This consists of the well-known projection M, formed on the cap D, which, according to my invention, is adapted to fit into the induction-conduit c, and is notched or grooved at its end at r to form an air-passage, through which air may escape when the projection M has been forced into a conduit c and against the piece I sufficiently to permit an outflow through the valve. To do this, it is necessary to unscrew the cap D and invert it.

It will be seen that my invention provides a simple valve, which is not liable to become inoperative or impaired in use, which can be readily operated to deflate the tire, and from which oil and foreign matter will be excluded.

In operation the cap D is unscrewed and any suitable pump connected to the valve, whereupon air flows through the conduit c and the recesses e and g, between the disk G and plug H, into the tire A. The reverse action is normally prevented by the contact of the disk at its free portion with the sides of the plug and by the leak-tight joint between the disk and the valve-casing. To deflate the tire, the user need only insert a suitable tool into the valve and push inwardly either the plug H, until its reduced portion reaches the disk G, or push in both the piece I and the plug with it.

It will be understood that my invention is not limited to the particular construction set forth and described, which is the preferred form of the invention, but that it may be variously modified and applied without departing from its essential features.

Fig. 4 shows one modified form, in which the casing of the valve consists of an eduction-shell E', an induction-shell F', and an intermediate coupling N, engaging a screw-thread on a shell E' and a collar on the shell F' for clamping the parts together, the other parts of the valve being substantially identical with that hereinbefore described, except that the movable piece here lettered I' is not tapered at its lower end, the shell E' is molded to the tire instead of being clamped thereto, and the cap here lettered D' screws over the upper end of the casing F'.

What I claim is, in valves, the following-defined novel features and combinations, substantially as hereinbefore set forth, namely:

1. In a valve, a casing having a conduit, in combination with a flexible valve interrupting said conduit, and a movable part at the ingress side of said flexible valve, constructed when moved toward the latter to permit an outward flow through the valve.

2. In a valve, a casing having a conduit, in combination with a flexible disk interrupting said conduit, having a leak-tight joint with said casing around its outer portion, but left free at its center and perforated at its free portion, and a movable part at the ingress side of said flexible valve, constructed when moved toward the latter to permit an outward flow through the perforation of said disk.

3. In a valve, the casing, in combination with a perforated flexible disk inclosed therein, an imperforate plug passing through the perforation in said disk, and a movable part at the ingress side of said disk, constructed when moved against it to permit an outflow through its perforation.

4. In a valve, the casing, in combination with a perforated flexible disk inclosed therein, an imperforate plug passing through the perforation in said disk, and an annular movable part surrounding said plug and constructed when moved against said disk to distend the latter and permit an outflow around said plug.

5. In a valve, the casing, in combination with a perforated flexible disk inclosed therein, an imperforate plug passing through the perforation in said disk, and an annular movable part surrounding said plug and constructed when moved against said disk to distend the latter and permit an outflow around said plug, said movable part having a tapering end for distending said disk.

6. In a valve, a casing having a conduit, in combination with a flexible disk inclosed therein to interrupt said conduit, having a leak-tight joint with said casing around its outer portion, but left free at its center and perforated at its free portion, and an imperforate plug passing through the perforation in said disk, movable independently of said casing and constructed with a reduced portion at the ingress side of said disk, whereby when moved until its reduced portion is opposite said perforation an outflow through the valve is permitted.

7. In a valve, the combination, with an induction-casing having a conduit and a valve connected thereto, of a fibrous material in said conduit at the ingress side of said valve, adapted to arrest foreign matter entering said conduit.

8. In a valve, the combination, with an induction-casing having a conduit and a valve connected thereto, of an absorbent material in said conduit at the ingress side of said valve for absorbing oil entering said conduit.

9. In a valve, a casing having a conduit, a flexible perforated disk in said casing and interrupting said conduit, a plug passing through said disk and partially filling said conduit at the induction side of the valve, and an absorbent material carried on said plug, substantially as and for the purpose set forth.

10. In a valve, a molded rubber washer having a thin central portion and an integral outer annular rib of greater thickness than said central portion, said rib adapted to be clamped between the parts of the valve and serve as a packing.

11. In a valve, a molded rubber washer having a thin central portion and an integral outer annular rib adapted to be clamped between the parts of the valve and serve as a packing, and a metallic ring molded in said rib to prevent its distortion.

12. In a valve, the casing and a perforated valve-disk, as G, in combination with a movable plug, as H, traversing the perforation in said disk and constructed with a tapered portion, as j, constructed when said plug is moved toward the egress side of the disk to permit a reverse flow through the valve.

13. In a valve, the casing constructed with an annular lip o, in combination with a disk, as G, having an enlarged annular rib fitting exteriorly against said rib o and adapted to be clamped in position thereagainst, whereby its inward distortion is prevented by said lip.

14. In a valve, the combination, with a casing constructed of two parts and a disk adapted to be clamped between said parts, of an antifriction-ring, as K, arranged at the ingress side of said disk and between the latter and the adjacent part of the casing and adapted to permit relative movement of the parts of the casing and prevent distortion of the disk thereby.

15. In a valve, the combination, with the shell or casing, the induction-conduit, and the movable part therein, of a cap adapted to close the upper end of the casing and constructed with a groove projection M, adapted to be inserted into the induction-conduit for actuating said movable part.

16. In a valve, the casing and a perforated disk, as G, in combination with the plug, as H, traversing the perforation of said disk and constructed with an enlarged head, as $j'$, at the egress side thereof, substantially as and for the purpose set forth.

In witness whereof I have hereunto signed my name in the presence of two subscribing witnesses.

GEORGE H. F. SCHRADER.

Witnesses:
GEORGE H. FRASER,
CHARLES K. FRASER.